(12) United States Patent
Yoon et al.

(10) Patent No.: US 8,295,197 B2
(45) Date of Patent: Oct. 23, 2012

(54) APPARATUS AND METHOD OF DETERMINING MAXIMUM SEGMENT SIZE OF DATA CALL IN MOBILE COMMUNICATION SYSTEM

(75) Inventors: Dae-Eui Yoon, Gyeonggi-do (KR); Du-Jin Cha, Gyeonggi-do (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 294 days.

(21) Appl. No.: 12/726,399

(22) Filed: Mar. 18, 2010

(65) Prior Publication Data

US 2010/0290357 A1 Nov. 18, 2010

(30) Foreign Application Priority Data

May 14, 2009 (KR) ........................ 10-2009-0042094

(51) Int. Cl.
*G01R 31/08* (2006.01)
*H04J 3/24* (2006.01)

(52) U.S. Cl. ........................ 370/252; 370/235; 370/474
(58) Field of Classification Search ........................ None
See application file for complete search history.

(56) References Cited

U.S. PATENT DOCUMENTS

| 6,021,182 | A  | * | 2/2000  | Toyosawa et al. ......... 379/90.01 |
| 7,275,093 | B1 | * | 9/2007  | Freed et al. ................... 709/223 |
| 7,920,481 | B2 | * | 4/2011  | Winter et al. ................. 370/248 |
| 2005/0283639 | A1 | * | 12/2005 | Le Pennec et al. ............... 714/4 |
| 2006/0045131 | A1 | * | 3/2006  | Pancholi et al. ............. 370/472 |
| 2007/0171828 | A1 | * | 7/2007  | Dalal et al. ................... 370/235 |
| 2009/0303947 | A1 | * | 12/2009 | Karino et al. ................. 370/329 |

* cited by examiner

*Primary Examiner* — Kwang B Yao
*Assistant Examiner* — Jutai Kao
(74) *Attorney, Agent, or Firm* — Cha & Reiter, LLC

(57) ABSTRACT

An apparatus and method for determining a maximum segment size (MSS) in a mobile communication system. When the portable terminal accesses a multimedia service server through a data call, the method includes confirming whether or not a maximum segment size (MSS) of the server is stored; if the MSS is stored, the server is accessed using the MSS; and if the MSS is not stored, determining the MSS of the server through a ping procedure.

14 Claims, 2 Drawing Sheets

APPARATUS AND METHOD OF DETERMINING MAXIMUM SEGMENT SIZE OF DATA CALL IN MOBILE COMMUNICATION SYSTEM

CLAIM OF PRIORITY

This application claims the benefit of the earlier filling data, under 35 U.S.C. §119, from patent application No. Ser. No. 10-2009-0042094 filed in the Korean Intellectual Property Office on May 14, 2009, the contents of which are incorporated by reference in its entirety.

BACKGROUND OF THE INVENTION

1. Field of the Invention

The present invention relates generally to a mobile communication system. More particularly, the present invention relates to an apparatus and method for determining a maximum segment size (MSS) in a mobile communication system.

2. Description of the Related Art

In a modern society, the penetration rate of a portable terminal has drastically increased due to its convenience and necessity, such that the portable terminal is now becoming a universal necessity of our contemporaries. Over time, service providers and terminal manufacturers continue to provide additional functions to increase utilization of the portable terminal, and especially with regard to data call services using the portable terminal that have been extensively used.

As mobile communication techniques continue to be developed, new data services of a very fast speed become available to users through the data call services. When a variety of data services are provided through the data call services, applications of the portable terminal need to determine a maximum transmission unit (MTU) and an MSS. The MTU refers to the maximum value of a packet frame size and the MSS means the maximum value of an original data size excluding a header of the MTU. The MTU and MSS need to be determined with an appropriate value based on a routing method of a server that needs to be accessed, an application property, and a server property. In more detail, if the MTU is too large, when a packet before reaching its destination reaches a router that cannot process packets of a corresponding size, the packet is fragmented and is re-transmitted. On the contrary, if the MTU is too small, the overhead increases due to frequent transmission of packets.

As mentioned above, in order to achieve effective operations of data services, the MTU and MSS need to be appropriately determined according to certain service properties. However, the portable terminal uses the MSS of a fixed value with respect to all data services. For example, even if a property of each application and an accessed server are changed, the portable terminal continues accessing each server using the same MSS. Accordingly, there is a need for an alternative proposal to improve the performance of data services determining and applying the optimized MSS value that is unknown heretofore.

SUMMARY OF THE INVENTION

The present invention substantially solves many of the above problems and/or disadvantages and provides at least the advantages discussed hereinbelow. Accordingly, an object of the present invention is to provide an apparatus and a method for determining an optimized maximum segment size (MSS) during a data call in a mobile communication system.

According to an exemplary aspect of the present invention, an operation method of a portable terminal preferably includes: when the portable terminal accesses a multimedia service server through a data call, confirming whether an MSS of the server is stored or not; if the MSS is stored, then accessing the server using the MSS; and if the MSS is not stored, then determining the MSS of the server through a ping procedure.

According to another exemplary aspect of the present invention, a portable terminal apparatus preferably includes: an MSS manager, when the portable terminal accesses a multimedia service server through a data call, confirming whether an MSS of the server is stored or not and, if the MMS is not stored, then determining the MSS of the server through a ping procedure; and if the MSS is stored a control unit, accessing the server using the MSS.

BRIEF DESCRIPTION OF THE DRAWINGS

The above and other exemplary objects, features and advantages of the present invention will become more apparent to a person of ordinary skill in the art from the following detailed description when taken in conjunction with the accompanying drawings in which.

DETAILED DESCRIPTION

Figure 1:
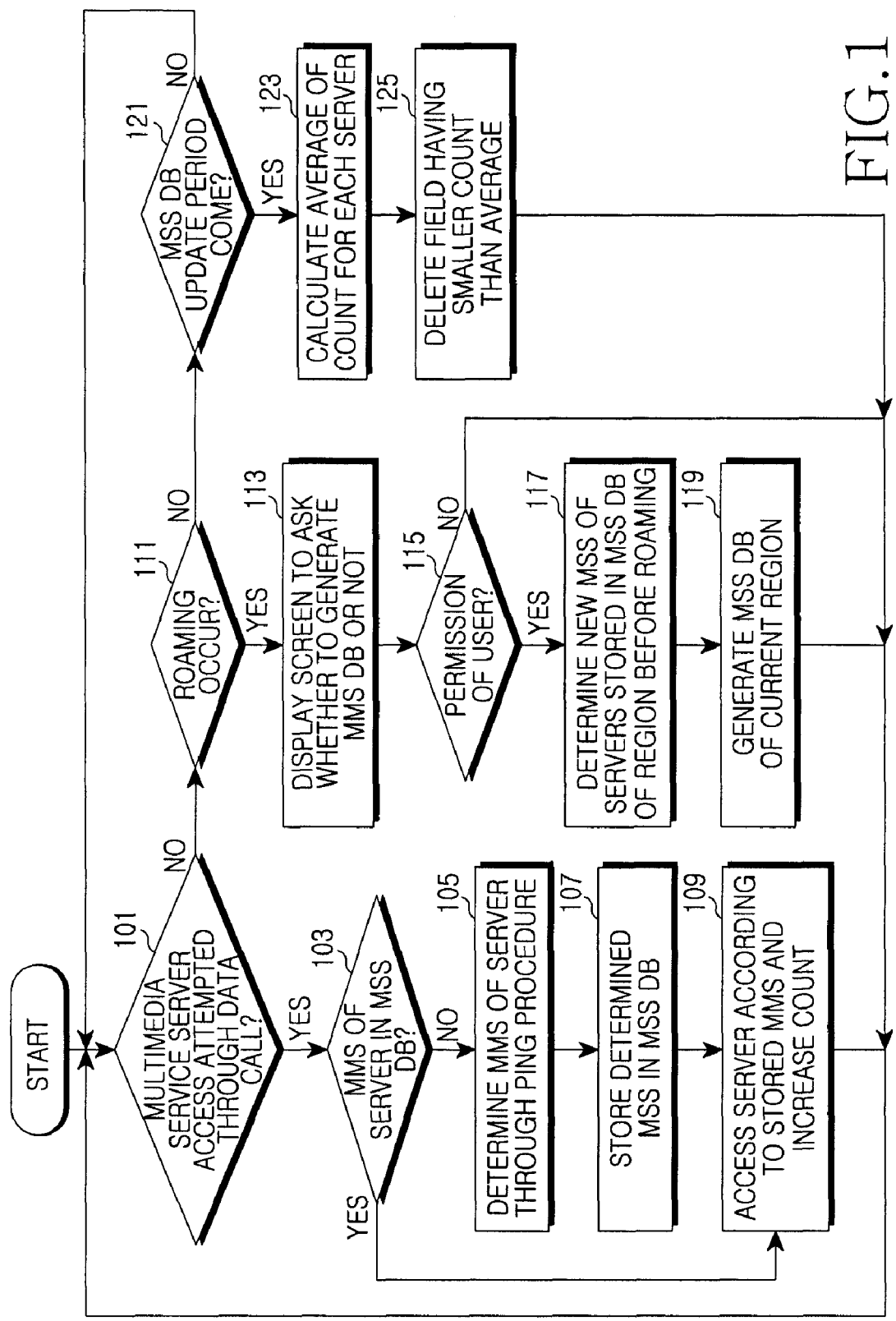
FIG. 1 is a flowchart illustrating operational procedures of a mobile terminal according to an embodiment of the present invention.

The following description, with reference to the accompanying drawings, is provided to assist a person of ordinary skill in the art with a comprehensive understanding of exemplary embodiments of the present invention as defined by the claims. While the description includes various specific details to assist in that understanding if the invention, it should be noted that these details are to be regarded as merely illustrative. Accordingly, those of ordinary skill in the art will recognize that various changes and modifications of the exemplary embodiments described herein can be made without departing from the scope and spirit of the invention as defined by the appended claims. Also, descriptions of well-known functions and constructions may be omitted for conciseness and so as not to obscure appreciation of the present invention by a person of ordinary skill with such well-known functions and constructions.

Hereinafter, objects of the present invention describe a technique for determining an optimized maximum segment size (MSS) value during a multimedia service using a data call service in a mobile communication system. In the exemplary description below, the portable terminal preferably includes cellular phones, personal portable communication phones, multiple wireless devices, and IMT2000 terminals, but such hardware is merely provided to illustrate understand of the invention and not for limiting the claimed invention.

The portable terminal of the present invention determines an MSS of the server when an application for multimedia services such as e-mail, streaming, etc. attempts to access a server through a data call service. Then, the determined MSS is stored in an MSS database (DB). At this point, the portable terminal analyzes a packet requested by the application in order to determine whether the MSS is set up or not. That is, the portable terminal confirms a port, a protocol, and an URL of a server through the packet and confirms whether an MSS of the server is stored in the MSS DB or not using the port, protocol, and URL of the server. Based on a confirmation result, if the MSS of the server is stored in the MSS DB, the portable terminal utilizes the stored MSS but if not, sets up a new MSS.

The determination of processes for an MSS are as follows. The portable terminal determines an optimized MSS by using a ping procedure. When an initial MSS is determined, the portable terminal generates a maximum transmission unit (MTU) of a predetermined initial value to perform the ping procedure. For example, 576 bytes may be used as the predetermined initial value of an MTU value.

If the ping procedure is successful using the initial MTU value, the portable terminal applies an MTU having a mean value of the initial value and the maximum available value of the MTU to perform a ping procedure again. Until the ping procedure may fail, the portable terminal increases the MTU value through the same manner and repeatedly performs the ping procedure. If the ping procedure fails during the repeat performing of the ping procedure, and the portable terminal confirms an MTU value used for the last successful ping procedure and determines an MSS value of a corresponding server according thereto.

If the ping procedure failed using the MTU of the initial value, the portable terminal preferably performs a ping procedure by using a mean value of the initial value and the minimum available value of the MTU. Until the ping procedure is successful, the portable terminal increases the MTU value through the same method, and repeatedly performs the ping procedure. If the ping procedure is successful during the repeat performance of the ping procedure, the portable terminal confirms an MTU value used for the successful ping procedure and determines an MSS value according thereto.

After the determining the MSS value, the portable terminal stores the determined MSS value in the MSS DB. In the MSS DB, a host name, an IP address, an MSS, and a count constitute respective fields and each field corresponds to each server. Here, the host name means a domain name of a server and the count means the number of accesses to a server. The count is initialized during the MSS determination and is increased by 1 each time a server is accessed. The host name and IP address are used for a domain name service (DNS) signaling overhead removal and fast access by omitting a DNS query during reconnection to the server, and the counter is used to determine whether a field is to be deleted or not during a periodic MSS DB update.

While accessing a server (not stored in the DB) after an initial MSS is determined, the portable terminal determines an MSS of the server to be accessed through the same method used when the initial MSS is determined. At this point, the initial MTU value is a used as a value corresponding to the lastly determined MSS value. For example, when the portable terminal accesses a server B after an MSS of a server A is determined "as 1020", an initial MTU value for determining an MSS of the server B is set as '1020+header size'. Then, the determined MSS value is stored in an MSS DB in addition to a host name, an IP address, and a count of a corresponding server.

Roaming of the portable terminal can be performed as a user moves. When the portable terminal is roaming, it generates a new MSS DB corresponding to a corresponding region. That is, even when accessing the same server before/after the roaming, because a routing path may have changed due to a region change, an MSS value determined for a region (where the portable terminal is placed before the roaming) may be inappropriate. Accordingly, after the roaming, the portable terminal newly determines all the stored MSS values and generates an additional MSS DB corresponding to a currently positioned region. Then the portable terminal indexes an MSS DB for each region with a mobile country code (MCC)/a multimedia messaging center (MMC). Accordingly, during the roaming, the portable terminal confirms whether there is an MSS DB corresponding to a particular corresponding region. Then, if there is the MSS DB, the portable terminal uses an MSS DB, or alternatively, generates a new MSS DB. At this point, before the generating of the new MSS DB, the portable terminal asks a user whether a new MSS DB is to be generated or not. If the inquiry is permitted by the user, after loading a server list in an already existing MSS DB, the portable terminal determines an MSS of each server included in the server list.

In addition, the portable terminal periodically preferably deletes unnecessary MSS values from the MSS DB. In more detail, when an MSS DB update period comes, the portable terminal calculates an average number of counts for each server stored in the MSS DB. Then, the portable terminal deletes fields (having a smaller count than the average), for example, a host name, an IP address, an MSS, and a count.

Table 1 through Table 3 below provide transfer time test results when a video file of 431 KB is transmitted.

TABLE 1

| No. | Time | Source | Destination | Protocol | Info |
|---|---|---|---|---|---|
| 17 | 2.513000 | 10.19.50.212 | 66.209.11.32 | TCP | 1027 > http [SYN] Seq=0 win=32768 Len=0 MSS=1020 |
| 18 | 2.665000 | 4d:4f:4e:54:4f:52 | 4e:45:54:57:52:4b | 0x1984 | Netmon Train |
| 19 | 2.693000 | 4d:4f:4e:54:4f:52 | 4e:45:54:57:52:4b | 0x1984 | Netmon Train |
| 20 | 2.696000 | 4d:4f:4e:54:4f:52 | 4e:45:54:57:52:4b | 0x1984 | Netmon Train |
| 21 | 2.713000 | 172.18.145.103 | 10.19.50.212 | DNS | Standard query response, no such name |
| 22 | 2.871000 | 66.209.11.32 | 10.19.50.212 | TCP | http>1027 [SYN, ACK] Seq=0 Ack=1 win=33660 Len=0 MSS=1432 |
| 23 | 2.880000 | 10.19.50.212 | 66.209.11.32 | TCP | 1027>http [ACK] Seq=1 Ack=1 win=33660 Len=0 |
| . | . | . | . | . | . |
| . | . | . | . | . | . |
| . | . | . | . | . | . |
| 1037 | 97.173000 | 10.19.50.212 | 66.209.11.32 | MMSE/ | MMS m-send-req (text/plain) (video/3gpp) |
| 1038 | 97.439000 | 66.209.11.32 | 10.19.50.212 | SMI | http<1027 [ACK] Seq=1 Ack=441819 win=33660 Len=0 |
| 1039 | 97.638000 | 66.209.11.32 | 10.19.50.212 | TCP | http<1027 [ACK] Seq=1 Ack=441936 win=33660 Len=0 |
| 1040 | 98.148000 | 66.209.11.32 | 10.19.50.212 | TCP MMSE | mms m-send=conf |

TABLE 2

| No. | Time | Source | Destination | Protocol | Info |
|---|---|---|---|---|---|
| 4 | 3.654000 | 10.25.164.119 | 66.209.11.32 | TCP | iad1>http [SYN] Seq=0 win=32768 Len=0 MSS=1432 |
| 5 | 4.060000 | 66.209.11.32 | 10.25.154.119 | TCP | http>iad1 [SYN, ACK] Seq=0 Ack=1 win=8192 Len=0 MSS=1432 |
| 6 | 4.091000 | 10.25.164.119 | 66.209.11.32 | TCP | iad1>http [ACK] Seq=1 Ack=1 win=32936 Len=0 |
| 7 | 4.113000 | 10.25.164.119 | 66.209.11.32 | TCP | [TCP segment of a reassembled PDU] |
| 8 | 4.131000 | 10.25.164.119 | 66.209.11.32 | TCP | [TCP segment of a reassembled PDU] |
| 9 | 4.620000 | 66.209.11.32 | 10.25.154.119 | TCP | http>iad1 [ACK] Seq=1 Ack=479 win=32458 Len=0 |
| . | . | . | . | . | . |
| . | . | . | . | . | . |
| . | . | . | . | . | . |
| 649 | 68.409000 | 10.19.50.212 | 66.209.11.32 | MMSE/SMI | MMS m-send-req (text/plain) (video/3gpp) |
| 650 | 68.525000 | 66.209.11.32 | 10.25.154.119 | TCP | http>iad1 [ACK] Seq=1 Ack=440799 win=32936 Len=0 |
| 651 | 69.014000 | 66.209.11.32 | 10.25.154.119 | TCP | http>iad1 [ACK] Seq=1 Ack=441936 win=32936 Len=0 |
| 652 | 693713000 | 66.209.11.32 | 10.25.154.119 | MMSE | MMS m-send-conf |

TABLE 3

| No. | Time | Source | Destination | Protocol | Info |
|---|---|---|---|---|---|
| 1 | 0.000000 | 10.25.190.186 | 66.209.11.32 | TCP | neod1>http [SYN] Seq=0 win=32768 Len=0 MSS=1460 |
| 2 | 0.396000 | 66.209.11.32 | 10.25.190.186 | TCP | http>neod1 [SYN, ACK] Seq=0 Ack=1 win=8192 Len=0 MSS=1432 |
| 3 | 0.427000 | 10.25.190.186 | 66.209.11.32 | TCP | neod1>http [ACK] Seq=1 Ack=1 win=32936 Len=0 |
| 4 | 0.445000 | 10.25.190.186 | 66.209.11.32 | TCP | [TCP segment of a reassembled PDU] |
| 5 | 0.460000 | 10.25.190.186 | 66.209.11.32 | TCP | [TCP segment of a reassembled PDU] |
| 6 | 0.952000 | 66.209.11.32 | 10.25.190.186 | TCP | http>nedo1 [ACK] Seq=1 Ack=479 win=32458 Len=0 |
| . | . | . | . | . | . |
| . | . | . | . | . | . |
| . | . | . | . | . | . |
| 689 | 82.719000 | 10.25.190.186 | 66.209.11.32 | MMSE/SMI | MMS m-send-req (text/plain) (video/3gpp) |
| 690 | 82.825000 | 66.209.11.32 | 10.25.190.186 | TCP | http>neod1 [ACK] Seq=1 Ack=440799 win=33580 Len=0 |
| 691 | 83.334000 | 66.209.11.32 | 10.25.190.186 | TCP | http>neod1 [ACK] Seq=1 Ack=441936 win=33580 Len=0 |
| 692 | 83.974000 | 66.209.11.32 | 10.25.190.186 | TCP | [TCP previous segment lost] http>neod1 [FIN, ACK] Seq=197 |
| 693 | 83.979000 | 10.25.190.186 | 66.209.11.32 | TCP | [TCP Dup ACK 687#1] neod1>http [ACK] Seq=441937 Ack=1 win= |
| 694 | 83.987000 | 66.209.11.32 | 10.25.190.186 | MMSE | [TCP Retransmission] MMS m-send-conf |

Table 1 above represents a video file transfer time when an MSS is 1020. Table 2 represents a video file transfer time when an MSS is 1432. Table 3 represents a video file transfer time when an MSS is 1460. In Table 1, it takes about 96 sec and 1040 frames are used. In Table 2, it takes about 66 sec and 652 frames are used. In Table 3, it takes about 83 sec and 694 frames are used. That is, as shown in Tables 1 through 3, when the MSS is optimized as 1432, it is confirmed that a transfer time is the shortest. Accordingly, communication performance can be improved by determining the optimized MSS through the above processes.

Hereinafter, operations and configuration of a portable terminal for determining an MSS using the above process of the present invention will be described in more detail with reference to the accompanying drawings.

FIG. 1 is a flowchart illustrating operational procedures of a mobile terminal according to an exemplary embodiment of the present invention.

Referring now to FIG. 1, at step 101 the portable terminal confirms whether an access to a multimedia service server is attempted or not through a data call. That is, the portable terminal confirms that an application for a multimedia service is executed and a server access request is generated by the application.

Once the access to a multimedia service server is attempted, at step 103 the portable terminal proceeds to confirm whether or not an MSS of the server is in an MSS DB. That is, the portable terminal confirms that an MSS of the predetermined server is stored in the MSS DB or not. If the MSS of the server is stored in the MSS DB, the portable terminal proceeds to step 109.

If at step 103 the portable terminal confirms that an MSS of the predetermined server is not stored in the MSS DB, the portable terminal proceeds to step 105 to determine an MSS of the server through performing a ping procedure. In more detail, the portable terminal selects an initial value of an MTU value, and repeatedly performs a ping procedure by changing the MTU value based on a predefined rule, and determines an MSS value from the maximum value among MTU values with which ping procedures are successful That is, if the ping procedure is successful, the portable terminal increases the MTU value and if not, the portable terminal reduces the MTU value. Then, the portable terminal performs the ping procedure again if it previously failed. For example, when the MTU value is increased, an MTU value for the nth ping procedure is changed into a mean value of an MTU value used for the (n−1)th ping procedure and the maximum available value of an MTU. In addition, when the MTU value is decreased, an MTU value for the nth ping procedure is changed into a mean value of an MTU value used for the (n−1)th ping procedure and the minimum available value of an MTU. At this point, the portable terminal uses an MTU value corresponding to the latest determined MSS value as the initial value. However, when an initial MSS is determined (that is, there is no MSS determination history), since there is no latest determined MSS, the portable terminal uses a predetermined specific value as an initial value.

After the determining of the MSS value, at step 107 the portable terminal stores the determined MSS value in the MSS DB. That is, the portable terminal generates a field for the server in the MSS DB and stores the MSS, host name, IP address, and count therein.

Next, at step 109 the portable terminal accesses the server based on the MSS of the server stored in the MSS DB. Additionally, the portable terminal increases a count value of the server by 1. Accordingly, the exemplary method returns to step 101 simultaneously when receiving a multimedia service from the server.

Referring back to step 101, if the access to a multimedia service server is not attempted through the data call, then at step 111 the portable terminal confirms whether or not roaming occurs. That is, the portable terminal confirms a service region is changed or not due to geographical movement.

Once the roaming occurs, at step 113 the portable terminal displays a screen asking whether to generate a new MSS DB for a current region or not. For example, the portable terminal displays a pop-up window to receive permission about whether to generate the new MSS DB.

Next, at step 115 the portable terminal confirms that the new MSS DB generation is permitted by a user. That is, the portable terminal confirms that a key input corresponding to the permission occurs or not. If the new MSS DB generation is not permitted, the portable terminal returns to step 101.

On the contrary, if at step 115 the new MSS DB generation is permitted, then at step 117 the portable terminal then determines the new MSS of each server stored in an MSS DB of a region before roaming. That is, the portable terminal loads a server list from an MSS DB of a region before roaming and then determines an MSS of each server included in the list. At this point, the MSS is determined preferably through a ping procedure as in step 105.

After the determining of the new MSS, at step 119 the portable terminal proceeds to generate an MSS DB of a current region and store the MSS determined in step 117. At this point, the MSS DB for each region is indexed with MCC/MMC. Next, the method returns to step 101.

In step 111, if the roaming does not occur, then at step 121 the portable terminal confirms whether an MSS DB update period comes (has passed). For example, the period may be set with one week and the period may vary according to a user's or default intention of the present invention.

If at step 121 the MSS DB update period comes, then at step 123 the portable terminal calculates an average value of counts for each server. That is, the portable terminal sums up the count values of servers stored in the MSS DB and then divides the added result value by the number of servers.

After step 123 in which the calculating of the average of counts for each server is performed, at step 125 the portable terminal deletes fields that have a smaller count than the average. Thereby, an MSS, a host name, an IP address, and a count for a server with a less access frequency are deleted.

Figure 2:
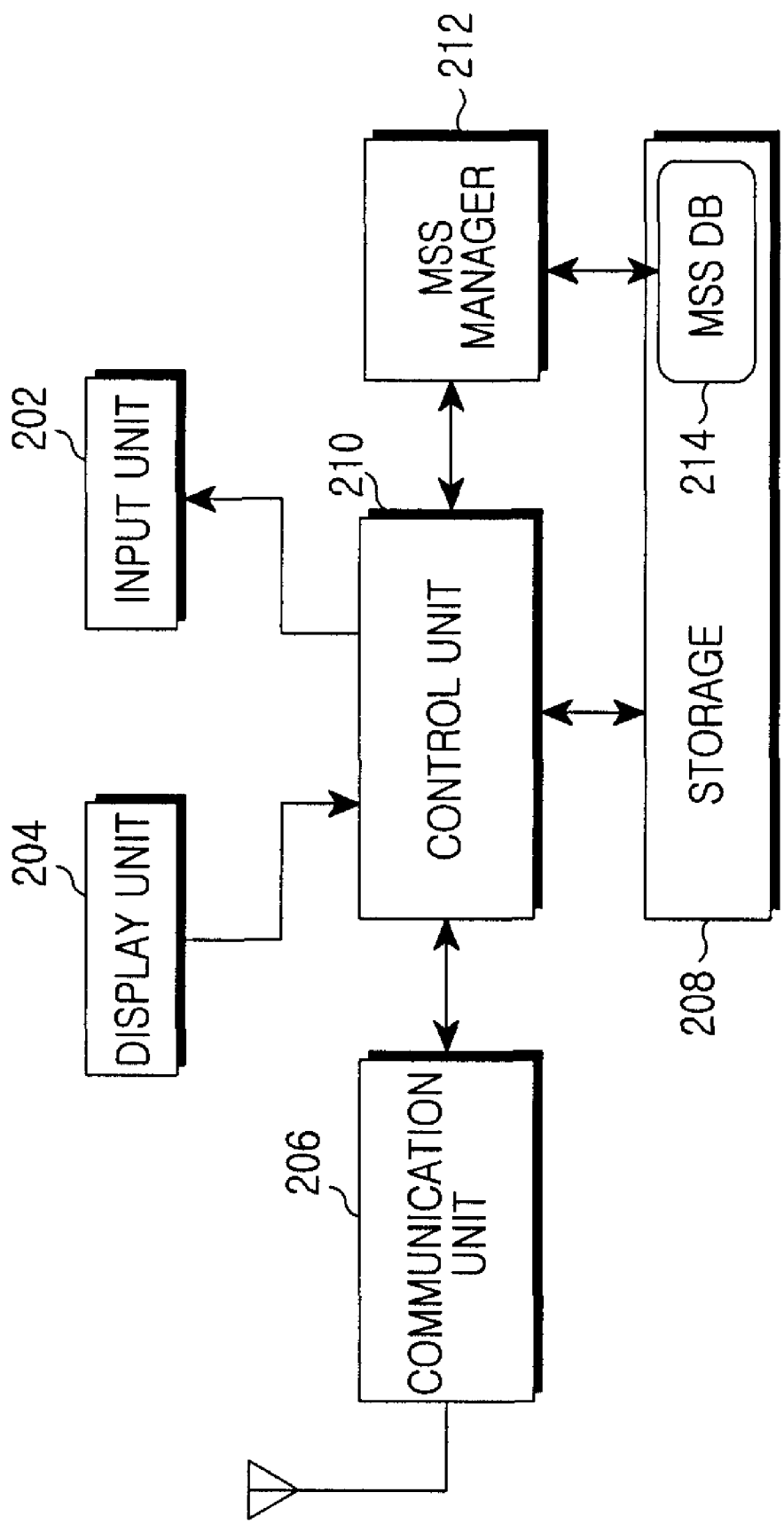
FIG. 2 is a block diagram illustrating a portable terminal in a mobile communication system according to an embodiment of the present invention.

FIG. 2 a block diagram illustrating a portable terminal in a mobile communication system according to an exemplary embodiment of the present invention.

As shown in FIG. 2, the portable terminal preferably includes an input unit 202, a display unit 204, a communication unit 206, a storage 208, a control unit 210, and an MSS manager 212.

The input unit 202 recognizes an input generated by a user and provides information corresponding to the input to the control unit 210. That is, the input unit 202 processes a user input inputted through, for example, a keyboard, a keypad, a touch screen, a touch pad, a mouse, or a special function button. The display unit 204 displays numbers, letters, and images according status information and application program execution, which may occur during an operation of the portable terminal. That is, the display unit 204 visually displays image data provided from the control unit 210. For example, the display unit 104 preferably includes a liquid crystal display (LCD) and an organic light-emitting diode (OLED), but any type of thin-film screen technology can be used. For example, the display unit 204 displays a screen for asking whether to generate a new MSS DB for a region after roaming, in response to a control by the control unit 210.

The communication unit 206 provides an RF interface for connection to a wireless net. That is, the communication unit 206 converts a bit string provided from the control unit 210 to a physical radio frequency (RF) signal and then transmits the converted RF signal through an antenna, and also converts a physical RF signal received through the antenna into a bit string and then provides the converted bit string to the control unit 210.

The storage 208 stores an operating system (OS), applications, microcodes, and contents, necessary for an operation of the portable terminal. That is, the storage 208 provides data requested by the control unit 210 and stores data provided from the control unit 210. Especially, the storage 208 includes an MSS DB 214.

The control unit 210 controls general functions of the portable terminal. For example, the control unit 210 typically processes procedures corresponding to a user input recognized by the input unit 202 and provides image data to the display unit 204. Then, the control unit 210 generates transmission data and provides them to the communication unit 206. Also, the control unit 210 executes an application stored in the storage 208. Especially, if a service region is changed through roaming, the control unit 210 generates image data that asks whether or not to generate a new MSS DB, and provides the image data to the display unit 204. Accordingly, when the input unit 202 recognizes a user input corresponding to the permission, the control unit 210 calls the MSS manager 212 to generate a new MSS DB for a current region. In addition, when an application for a multimedia service through a data call is executed and a server access request occurs by the application, the control unit 210 calls the MSS manager 212. Then, the control unit 210 creates a socket connection with the multimedia service sever based on an MSS determined by the MSS manager 212.

The MSS manager 212 manages an MSS of the multimedia service server. That is, the MSS manager 212 determines an MSS of each server and also generates and manages an MSS DB. Functions of the MSS manager 212 preferably include an MSS determination function according to server access, an MSS DB update function according to roaming, and a periodic MSS DB update function.

The MSS determination function according to the server access is as follows. If being called from the control unit 210 according to the multimedia server access attempt, the MSS manager 212 confirms whether or not an MSS of the server is stored in the MSS DB 214. If the MSS of the server is not stored in the MSS DB 214, the MSS manager 212 determines an MSS of the server through a ping procedure. In more detail, the MSS manager 212 selects an initial value of an MTU value, performs a ping procedure repeatedly by changing the MTU value based on a predefined rule, and determines an MSS value from the maximum value among MTU values with which ping procedures are successful That is, if the ping procedure is successful, the MSS manager 212 increases the MTU value. If the ping procedure fails, the MSS manager 212 reduces the MTU value and then performs the ping procedure again. For example, when the MTU value is increased, an MTU value for the nth ping procedure is changed into a mean value of an MTU value used for the (n−1)th ping procedure and the maximum value of an MTU. In addition, when the MTU value is decreased, an MTU value for the nth ping procedure is changed into a mean value of an MTU value used for the (n−1)th ping procedure and the minimum value of an MTU. At this point, the MSS manager 212 uses an MTU value corresponding to the latest determined MSS value as the initial value. However, when an initial MSS is determined (that is, there is no MSS determination history), since there is no latest determined MSS, the MSS manager 212 uses a predetermined specific value as an initial value. After the determining the MSS of the server, the MSS manager 212 stores the determined MSS in the MSS DB 214. That is, the MSS manager 212 generates a field for the server in the MSS DB and preferably stores the MSS, host name, IP address, and count in the MSS DB 214. Next, each time the portable terminal accesses the server, the MSS manager 212 increases a count value of the server by 1.

The MSS DB update function according to the roaming is as follows. Once the control unit 210 requests a new MSS DB generation for a current region, the MSS manager 212 determines a new MMS of each server stored in an MSS DB of a region before roaming. That is, the MSS manager 212 loads a server list from an MSS DB 214 of a region before roaming and then determines an MSS of each server included in the list. At this point, the MSS is determined through the same ping procedure used for the MSS determination based on the server access. After the determining of the new MSS, the MSS manager 212 generates an MSS DB 214 of a current region and stores the newly determined MSS. At this point, the MSS DB 214 is indexed with MCC/MMC.

The periodic MSS DB update function is as follows. If the MSS DB update period comes, the MSS manager 212 then calculates an average of counts for each server. That is, the MSS manager 212 sums up count values of servers stored in the MSS DB 214 and then divides the added result value by the number of servers. Then, the MSS manager 212 deletes a field having a smaller count than the average. Thereby, an MSS, a host name, an IP address, and a count for a server with a less access frequency are deleted. Here, the period may be set with one week and the period may vary according to an intention of the present invention.

According to the present invention, an MMS is optimized based on a server in a mobile communication system, such that unnecessary packet retransmission is reduced and the number of frames for communication is reduced also.

The above-described methods according to the present invention can be realized in hardware or as software or computer code that can be stored in a recording medium such as a CD ROM, a RAM, a floppy disk, a hard disk, or a magneto-optical disk or downloaded over a network, so that the methods described herein can be executed by such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

While the invention has been shown and described with reference to certain preferred exemplary embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A method of determining a maximum segment size of a portable terminal, the method comprising:
   (a) confirming whether or not a maximum segment size (MSS) of the server is stored when the portable terminal accesses a multimedia service server through a data call;
   (b) accessing the server using the MSS if the MSS is stored; and
   (c) determining the MSS of the server through a ping procedure if the MSS is not stored;
   wherein the determining of the MSS of the server comprises:
   (i) selecting an initial value of a maximum transmission unit (MTU) value;
   (ii) repeatedly performing a ping procedure using a varied MTU
   (iii) confirming the maximum value among MTU values with which the ping procedures are successful; and
   (iv) determining the MSS of the server from the maximum value; and
   wherein the selecting of the initial value in (i) comprises:
   if there is an MSS determination history, selecting an MTU value corresponding to a latest determined MSS value as the initial value; and
   if there is no MSS determination history, selecting a predetermined specific value as the initial value.

2. The method of claim 1, wherein the repeatedly performing of the ping procedure in (ii) comprises:
   increasing the MTU value if the ping procedure is successful;
   decreasing the MTU value if the ping procedure fails; and
   re-performing the ping procedure after increasing or decreasing the MTU value.

3. The method of claim 2, wherein:
   the step of increasing the MTU value comprises increasing the MTU value comprises setting a median value of an MTU value used for an (n−1)th ping procedure and a maximum value of an MTU as an MTU value for an nth ping procedure; and
   decreasing the MTU value comprises setting a median value of an MTU value used for an (n−1)th ping procedure and the maximum value of an MTU as an MTU value for an nth ping procedure;
   wherein "n" is a variable integer.

4. The method of claim 1, further comprising increasing a count value of the server when the portable terminal accesses the multimedia service server through the data call in (a).

5. The method of claim 4, when an update period of an MSS database (DB) is reached, said method further comprising:
   calculating an average value of counts of servers stored in the MSS DB; and
   deleting a field having a smaller count than the average value.

6. The method of claim 1, when a service region is changed due to roaming, said method further comprising:
   newly determining a respective MSS of each server stored in an MSS database (DB) of a region before the roaming is performed; and
   storing the newly determined MSS for a current region.

7. The method of claim 6, further comprising:
   prompting a user whether or not to generate an MSS DB for the current region when the service region is changed due to the roaming being performed; and if the MSS DB generation for the current region is permitted by the user, newly determining the MSS.

8. An apparatus of a portable terminal comprising:
a maximum segment size (MSS) manager for confirming whether or not an MSS of a server is stored and if the MMS is not stored for determining the MSS of the server through a ping procedure when the portable terminal accesses a multimedia service server through a data call; and
a control unit for accessing the server using the MSS if the MSS is stored;
wherein the MSS manager:
selects an initial value of a maximum transmission unit (MTU) value;
repeatedly performs a ping procedure with a varied MTU value;
confirms a maximum value among MTU values with which the ping procedures are successful; and
determines the MSS of the server from the maximum value,
wherein the MSS manager selects an MTU value corresponding to the latest determined MSS value to be the initial value if there is an MSS determination history, and selects a predetermined specific value to be the initial value if there is no MSS determination history.

9. The apparatus of claim 8, wherein the MMS manager increases the MTU value if the ping procedure is successful, decreases the MTU value if the ping procedure fails, and re-performs the ping procedure after increasing or decreasing the MTU value.

10. The apparatus of claim 9,
wherein the MSS manager:
sets a median value of an MTU value used for an (n−1)th ping procedure and a maximum value of an MTU as an MTU value for an nth ping procedure when the MTU value is increased; and
sets a median value of the MTU value used for an (n−1)th ping procedure and the maximum value of an MTU as an MTU value for an nth ping procedure when the MTU value is decreased;
wherein "n" is a variable integer.

11. The apparatus of claim 8, wherein the MSS manager increases a count value of the server when the portable terminal accesses a multimedia service server through the data call.

12. The apparatus of claim 11, wherein the MSS manager calculates an average of counts of servers stored in the MSS database (DB) and deletes a field having a smaller count than the average when an update period of an MSS DB is reached.

13. The apparatus of claim 8, the MSS manager newly determines an MSS of each server stored in an MSS database (DB) of a region before roaming and stores the newly determined MSS for a current region when a service region is changed due to roaming.

14. The apparatus of claim 13, wherein:
the control unit displays a screen prompting a user whether or not to generate an MSS DB for the current region when the service region is changed due to the roaming; and
the MSS manager newly determines the MSS if the MSS DB generation for the current region is permitted by the user.

* * * * *

UNITED STATES PATENT AND TRADEMARK OFFICE
CERTIFICATE OF CORRECTION

| | |
|---|---|
| PATENT NO. | : 8,295,197 B2 |
| APPLICATION NO. | : 12/726399 |
| DATED | : October 23, 2012 |
| INVENTOR(S) | : Dae-Eui Yoon et al. |

Page 1 of 1

It is certified that error appears in the above-identified patent and that said Letters Patent is hereby corrected as shown below:

In the Claims:

Column 10, Claim 1, Lines 19-20 should read as follows:
--...using a varied MTU value;...--

Signed and Sealed this
Seventh Day of May, 2013

Teresa Stanek Rea
*Acting Director of the United States Patent and Trademark Office*